Dec. 8, 1970    H. H. VON DOEHREN ET AL    3,546,019
FUEL CELL AND FUEL CELL BATTERY
Filed Aug. 4, 1966

INVENTORS.
HANS HERMANN von DOEHREN
HANS ALFRED SCHULTZE
BY
ATTORNEY.

3,546,019
FUEL CELL AND FUEL CELL BATTERY
Hans Hermann von Doehren, Frankfurt am Main, and Hans Alfred Schultze, Neuenhain, Germany, assignors to Varta Aktiengesellschaft, Frankfurt am Main, Germany, a German corporation
Filed Aug. 4, 1966, Ser. No. 570,297
Claims priority, application Germany, Aug. 17, 1965, V 29,133
Int. Cl. H01m 27/00
U.S. Cl. 136—86                                    14 Claims

ABSTRACT OF THE DISCLOSURE

A fuel cell including an electrolyte chamber with electrolyte which includes a solid cellular material with intercommunication cells which is capable of taking up the excess volume of electrolyte formed during the reaction.

---

Figure 1:
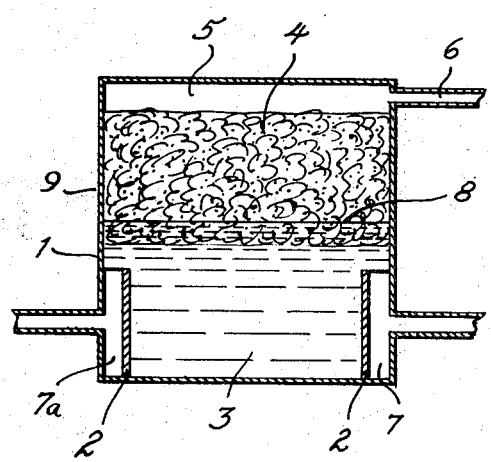

The present invention relates to a fuel cell, which is suitable for use in a fuel cell battery, and to a fuel cell battery, of the type in which the volume of the electrolyte is increased during the operation by the formation of reaction products which are released into or taken up by the electrolyte.

The invention provides a fuel cell which comprises cellular means having interconnecting cells for absorbing excess diluted electrolyte as it is formed in the electrochemical reaction.

Fuel cells are known devices in which electric current can be produced directly from combustible materials by electrochemical reaction.

An individual fuel cell is ordinarily made up of a cell container, two conducting electrodes consisting of or impregnated with a material having a catalytic effect upon the desired electrochemical reactions, insulators, connecting means associated with each electrode for establishing electrical contact with an external circuit, means for introducing an oxidizing gas to a cathode, means for introducing a fuel to an anode, and an electrolyte. Such fuel cells are described in the literature such as, for instance, in Fuel Cells, Ed. G. J. Young (vols. 1 and 2) (Reinhold Publishing Co. 1960) and Fuel Cell Systems ACS series 47 (1965), and in U.S. patents like 3,116,169, 2,947,797, 2,925,454 and others. During the electrochemical process, $O^{--}$ ions migrate into the electrolyte leaving behind two positive charges. Likewise, the fuel migrating into the electrolyte as positive charge ions, such as $H+$ ions in the case of hydrogen fuel, leaves behind a negative charge. The negative and positive ions then unite to form a neutral molecule in the solution. When, for instance, $O^{--}$ ions and $H+$ ions unite in the electrolyte, they form a neutral water molecule. Illustratively, in a process using potassium formate, as the fuel, and potash solution as the electrolyte, the oxidation of the formate in the potash solution proceeds to the formation of potassium carbonate and water. Similarly from methyl alcohol, formic acid and water can result; likewise from other fuels, liquid by-products and water are obtained.

The reaction products which are formed in the electrolyte, such as water or other liquids have the undesirable effect of diluting the electrolyte. The present invention deals with an apparatus and process to overcome the problem caused by the dilution of or decrease of concentration of the electrolyte.

Various devices and processes are known which are designed to overcome the increase in volume of the electrolyte and the dilution of the electrolyte by the removal of the water which is formed in the reaction of hydrogen-containing fuels in the fuel cell battery.

For example, in fuel cells which are operated with hydrogen and oxygen at elevated temperatures, it has been proposed to solve this problem by liquefying the reaction water, which enters the gas chamber in the vapor state, in suitable condensers. However, this mode of removing the water requires extensive and complex equipment because it is required that no more than the water formed in the reaction be removed in order to maintain a constant concentration of the electrolyte.

It has also been proposed, in another fuel cell system, to separate the reaction water from the liquid electrolyte by the use of an electrodialytic cell which is incorporated in suitable manner in the path of the circulating electrolyte.

In another system for the removal of the reaction water from the electrolyte in a fuel cell battery, a distillation device is incorporated into the extraneous part of the circulation system of the electrolyte.

As is readily apparent from the foregoing, the various systems for the removal and separation of the reaction water from the electrolyte of the fuel cells have the disadvantage that they require complex equipment, which is expensive and which in addition requires constant supervision and service. This equipment consumes also energy and is, for this reason, suitable only for such fuel cell batteries, which provide a sufficiently high output of electrical energy.

It is therefore an object of the present invention to provide a new fuel cell or fuel cell battery, respectively, which is capable of overcoming the adverse effects on the operation of the fuel cell caused by the undesired increase of the volume of the electrolyte by the reaction water or other reaction products formed during the operation of the fuel cell or battery, without the need for complex and expensive equipment and without the requirement of energy and supervision for the operation of such equipment.

It is another object of the invention to provide a new fuel cell or fuel cell battery which is adapted to continuously keep the concentration of the electrolyte at the desired level without the need for complex concentration equipment which is difficult to operate.

The objects of the invention are achieved by a fuel cell or fuel cell battery, respectively, which comprises, in addition, a receptacle for the reception of excess volume of electrolyte. The said receptacle is connected to the electrolyte chamber in fluid connection with the electrolyte of the fuel cell or fuel cell battery and comprises in its interior a solid, cellular material or sponge-like body with interconnecting or communicating pores or cells. Preferably, said cellular material or sponge-like body fills out the whole receptacle or at least the major part of it.

Accordingly, the present invention concerns a fuel cell or fuel cell battery of the type which comprises at least one electrolyte chamber and in which the volume of the electrolyte is increased during the operation by the formation of reaction products, wherein the excess of electrolyte volume is taken up by a container or receptacle which is connected to the electrolyte chamber and which contains a solid sponge body with interconnecting pores. Said container is connected to the electrolyte chamber in such manner that the electrolyte can pass from the electrolyte chamber into the said container and into the said sponge or cellular material. The sponge-like body or cellular material in the container preferably comprises a lyophobic or a hydrophobic material.

If desired, the said sponge-like body or cellular material may comprise a lyophilic or a hydrophilic material. In that case it is desirable that the said receptacle containing or being filled with the sponge-like body or cellular material be connected to the gas chamber of at least one of the electrodes or electrode types in the fuel or fuel cell battery by a gas line which connects into the upper portion of said container or receptacle.

It is advantageous, if desired, when the said sponge-like body or material comprises imbedded therein a concentrate of the electrolyte. The electrolyte may contain solid, particulate alkaline material such as potassium or sodium hydroxide. The concentrated electrolyte mixes with the dilute excess electrolyte absorbed by the sponge-like body thereby increasing again the concentration to the desired level. This embodiment of the invention may be employed with advantage with either lyophobic or lyophilic sponge material.

The invention will be more readily understood by reference to the accompanying drawings in which FIG. 1 is a schematic representation of a fuel cell which comprises above the electrolyte chamber a storage container or receptacle for the electrolyte in accordance with the present invention.

Figure 2:
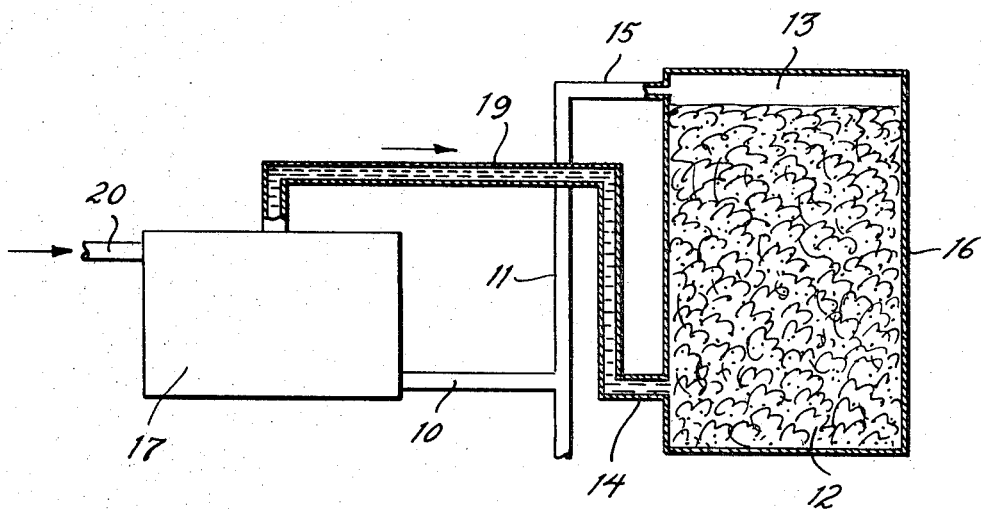

FIG. 2 is simplified schematic representation of a fuel cell battery which comprises a storage container or receptacle for the electrolyte in accordance with the present invention, which container is connected by conduit with the electrolyte chamber and by separate conduit with the gas chamber of one type of electrodes of the battery.

In one embodiment of the invention, the said storage container or receptacle is expediently provided at a level above the surface of the electrolyte in the electrolyte chamber. With this arrangement it is of advantage, if the sponge-like material contained in the said receptacle or storage container consists of or comprises a lyophobic material. With lyophilic sponges, the pores of the sponge might possible soak and up and remove from the electrolyte chamber, as a result of the capillary action of the lyophilic pores, a quantity of the electrolyte exceeding the volume of the reaction products or reaction water formed in the operation of the cell or battery. This generally does not occur with lyophobic or hydrophobic sponge material. With these the capillary pressure in the pores of the sponge material is equal or higher than the pressure of the undiluted electrolyte but less than that of the diluted electrolyte as its volume increases with the formation of liquid reaction products. In this manner a controlled soaking up of liquid reaction products is accomplished.

Instead of utilizing the lack of affinity of the sponge-like material towards the electrolyte for the control of the amount of excessive electrolyte which is removed from the electrolyte chamber, one may also use a lyophilic or hydrophilic material, respectively. The soaking up of excessive amounts of electrolyte is prevented and controlled by the use of a gas which has the required pressure and which therefore counteracts the capillary action of the sponge. Thus, the removal of the desired amounts of electrolyte can also be controlled by the use of a pressurized gas. Conveniently, this can be achieved by connecting the gas chamber or the gas inlet of one electrode or of one electrode type, respectively, of the fuel cell or fuel cell battery with the storage container in the above described manner. The gas inlet in the storage container or receptacle is preferably provided at a place away and most advantageously at a place opposite to the inlet for the electrolyte. As is apparent from the foregoing, with the lyophilic or hydrophilic materials a gas pressure may be applied on the sponge body to compensate for its hydrophilicity or lyophilicity, respectively, but to allow nonetheless for the gradual taking up of the electrolyte. By connecting suitable control devices, such as valves in the gas conduit between the storage container and the gas chamber, the gas pressure can be made to be less than the pressure caused by the increasing volume of electrolyte taking into account the capillary pressures in the pores of the foam material.

When the lyophobic or hydrophilic properties of the sponge materials, as is the case with some, vary under operating conditions of a fuel cell or fuel cell battery, it is recommended that in these instances, where the consistency of the lyophilic or hydrophilic properties of the sponge-like material is not assured, a conduit with pressurized gas be provided at the storage container as described above for the lyophilic sponge material. Thus, the gas pressure can be used to compensate for variations with such lyophobic materials which might be subject to change of their lyophobic properties during the operation of the cell. Similarly, such control may be used with hydrophobic sponge material, if needed The said storage container or receptacle is expediently coupled or connected to the electrolyte chamber removably e.g. by the use of removable joints or the like. It is also desirable that the said sponge-like body or material is arranged in the receptacle exchangeably. Thus, the sponge-like material can be removed at any desired time from the receptacle and replaced by a fresh like or dissimilar sponge-like material.

For instance, the sponge-like material may be a one piece (or independent segments) synthetic plastic (e.g. polyethylene, polystyrene) having interconnecting pores which are capable of soaking up the electrolyte. The sponge-like material can be an elastomer or be rigid.

The cellular means having interconnecting pores used in the invention are desirably a synthetic plastic, rigid or elastomeric, which is chemically inert to the electrolyte. Typical of such cellular materials are the urethane foams, (rigid or elastomeric), including polyesters-urethanes and polyethers-urethanes, multicellular polymers of ethylenically, vinyl or vinylidene unsaturated compounds such as polyvinyl chloride, polyethylene, polypropylene, high molecular weight polypropylene, polytetrafluoroethylene, polystyrene, copolymers like styrene acrylonitrile, polyesters, silicone resins and the like. These cellular plastics are known in the art (see, for instance, U.S. Pats. 2,548,438, 2,990,378, 3,003,977 and 3,112,281). They are generally manufactured by generating a gas in a fluid polymer, usually at elevated temperature. Thermoplastics are usually foamed by incorporating either a blowing agent which decomposes to a gas at elevated temperature, or an inert gas. Rubber latices are foamed by whipping mechanically to a froth.

The electrolytes which can be used in connection with the invention are known and include both basic or acidic aqueous types such as strong inorganic bases such as KOH, NaOH etc., aqueous strong mineral acids like sulfuric or phosphoric acids, and aqueous carbonate electrolytes. The initial concentration of electrolyte in the aqueous electrolyte solution may range from concentrations which are about 0.5 molar solutions to saturated solutions where the electrolyte employed is either an aqueous solution of a strong base or a strong acid. Where a carbonate electrolyte is employed the concentration may range from about 0.2 molar solutions to saturated solutions.

Aqueous potassium hydroxide solutions may range from 1–15 molar, from 4 to 8 being quite suitable.

The size of the pores of the cellular means is so selected as to allow for suitable control of the absorption of the electrolyte into the cellular means taking into account the capillary action of the pores (whether the cellular material is hydrophobic or hydrophilic), the pressure of the excess electrolyte and the compensating pressure of the gas, if such is used as described above.

As stated above, the present invention makes it also possible to maintain the concentration of the electrolye practically constant over longer periods of operation by providing in the sponge-like body or material in controlled distribution a concentrate of the electrolyte of the kind used in the fuel cell or fuel cell battery such as a solid alkaline material like pellets of sodium or potassium hydroxide. In the operation of the battery of fuel cell, the electrolyte concentrate is gradually dissolved or mixed and taken up in the electrolyte, as the diluted electrolyte penetrates more and more into the sponge-like body. Thus in effect, it is possible, with the present invention, to mix the diluted electrolyte with electrolyte concentrate and then by diffusion allow it to run down and return to the cell. The cellular material may also be removed from its container and excess electrolyte removed by squeezing, if the material is elastomeric, or rejuvenated by placing in contact with concentrated electrolyte to reestablish the desired concentration and then replaced in the receptacle.

One embodiment of the invention is demonstrated by way of example in FIG. 1 of the attached drawings. Fuel cell 1 comprises gas diffusion electrodes 2 which face electrolyte chamber 3 on one side and gas chambers 7 and 7a on the other side for the introduction of oxygen and hydrogen feed gas, respectively. At the top end of electrolyte chamber 3, above the level or surface of the electrolyte is provided receptacle 9 which contains the lyophobic absorbing material 4, leaving at the top of receptacle 9 gas space 5. The latter is connected over outlet 6 for the replaced gas. The water formed in the operation of the fuel cell dilutes the electrolyte which is shown in FIG. 1 to have penetrated into sponge 4 up to line 8.

Another embodiment of the invention is represented in FIG. 2 of the drawings. Fuel cell battery 17 which is illustrated schematically, comprises an electrolyte chamber and a gas chamber (both not shown) for each of the fuel gas and oxidant gas. Receptacle 16 comprises an electrolyte inlet 14 in its lower section and a gas inlet 15 in its top section which latter inlet connects to gas space 13 at the top of receptacle 16. Receptacle 16 is completely filled with the lyophilic sponge body 12 with the exception of the upper gas space 13. Electrolyte inlet 14 is connected by conduit 19 with the electrolyte chamber of the fuel cell battery. Gas inlet 15 at the top of the receptacle is connected by gas line 11 with the gas chamber of the battery containing either the fuel gas or the oxidant gas. Gas lines 20 and 10 are the feed lines for the fuel gas and oxidant gas, respectively, supplying the battery over the respective gas chambers with these gases. Control devices (not shown) may be disposed on line 11 and/or 15 to control the flow of gas. Thus, the pressurized gas in gas space 13 can be controlled so that only that volume of electrolyte is taken up in sponge 12 which corresponds to the increase in volume by the formation of the reaction products in the operation of the battery.

The principle and concept of providing in fuel cells and fuel cell batteries a receptacle for the reception of the excessive volume of electrolyte resulting from the reaction products formed in the electrochemical reaction, are employed with particular benefit in those fuel cells and fuel cell batteries which are designed to provide a relatively low electrical output. No special additional equipment is needed which would require for its operation part of the electrical energy produced by the cell or battery. The fuel cells and fuel cell batteries of the invention do also not require the relatively high investment for the additional equipment, nor do they require the service and supervision which are normally needed with such equipment of the prior art. Moreover, the system of the invention has the advantage of stabilizing the electrolyte. As the electrolyte permeates the pores of the cellular material or sponge-like body the surface of the liquid is increased extensively as it spreads within the inner surface of the cellular material, thereby expanding energy and being stabilized. Thus due to these and other advantages the fuel cells of the invention are a highly useful contribution to the art.

We claim:
1. In a fuel cell which comprises electrodes and an electrolyte chamber containing electrolyte in which the electrodes are immersed, a liquid-impervious receptacle distinct from the electrolyte chamber which contains a solid synthetic plastic cellular material having interconnecting pores, said material being in communication with the electrolyte chamber so that it is capable of taking up the increase of electrolyte volume due to the formation of liquid reaction products and in contact with the electrodes therein only by the intermediary of the electrolyte and conduit for gas inflow or outflow in gas communication with said cellular material to control the gas pressure in said receptacle and thereby the increase in volume of electrolyte which is absorbed by the pores of the cellular material.

2. The fuel cell of claim 1 wherein the cellular material is hydrophobic.

3. The fuel cell of claim 1 wherein the cellular material is hydrophilic.

4. The fuel cell of claim 1 wherein the cellular material is electrically non-conductive.

5. The fuel cell of claim 1 wherein the cellular material is partially filled with electrolyte.

6. The fuel cell of claim 1 which comprises a concentrated soluble electrolyte solute distributed in the cellular material.

7. The fuel cell of claim 1 wherein the cellular material is positioned in contact with the surface of the electrolyte.

8. The fuel cell of claim 1 which comprises a control device in the conduit to control the gas inflow or outflow.

9. The fuel cell of claim 1 which comprises an inlet conduit for electrolyte connected to the receptacle.

10. The fuel cell of claim 9 wherein the electrolyte inlet and gas conduit are positioned at substantially opposite ends of the receptacle.

11. The fuel cell of claim 1 which comprises a gas space in the receptacle above the cellular material in communication therewith and with the conduit for gas inflow and outflow.

12. In the process of producing electrical energy in a fuel cell which comprises electrodes and an electrolyte chamber containing electrolyte in which the electrodes are immersed, a liquid-impervious receptacle distinct from the electrolyte chamber which contains a solid synthetic plastic cellular material having interconnecting pores, said material being in communication with the electrolyte chamber so that it is capable of taking up the increase of electrolyte volume due to the formation of liquid reaction products and in contact with the electrodes therein only by the intermediary of the electrolyte and conduit for gas inflow or outflow in gas communication with said cellular material to control the gas pressure in said receptacle and thereby the increase in volume of electrolyte which is absorbed by the pores of the cellular material, the steps which comprise taking up the increase of electrolyte volume due to the formation of liquid reaction product during the electrochemical reaction into the pores of the cellular synthetic plastic material while controlling the gas pressure in the cellular material.

13. The process of claim 12 wherein a positive gas pressure is applied onto the pores of the cellular material to compensate for the uptake of the electrolyte therein.

14. The process of claim 12 wherein electrolyte from the electrolyte chamber of the fuel cell is flowed to the synthetic cellular plastic material in the receptacle and gas supplying the fuel cell is controllably fed to the upper portion of the receptacle containing the synthetic cellular plastic material.

References Cited
UNITED STATES PATENTS

| | | | |
|---|---|---|---|
| 227,448 | 5/1880 | Schlumberger | 136—159 |
| 354,434 | 12/1886 | O'Keenan | 136—159 |
| 631,873 | 9/1899 | Lavison | 136—86A |
| 3,005,943 | 10/1961 | Jaffe | 136—86UX |
| 3,364,071 | 1/1968 | Kordesch | 136—86 |

WINSTON A. DOUGLAS, Primary Examiner

H. A. FEELEY, Assistant Examiner